United States Patent [19]

Perry

[11] 4,330,830
[45] May 18, 1982

[54] TRANSIT VEHICLE CONTROL APPARATUS AND METHOD

[75] Inventor: Robert H. Perry, Peters Township, Allegheny County, Pa.

[73] Assignee: Westinghouse Electric Corp., Pittsburgh, Pa.

[21] Appl. No.: 97,766

[22] Filed: Nov. 27, 1979

[51] Int. Cl.³ .............................. G06G 7/70; B61L 3/00
[52] U.S. Cl. ................................. 364/436; 246/182 C; 246/187 B; 364/438; 364/426
[58] Field of Search .................... 364/426, 436, 438; 246/182 B, 182 C, 187 B, 184, 167 R, 63 C, 63 R, 63 A, 34 R, 34 A, 34 CT, 182 R

[56] References Cited

U.S. PATENT DOCUMENTS

| | | | |
|---|---|---|---|
| 3,493,741 | 2/1970 | Lubich | 246/167 R |
| 3,519,805 | 7/1970 | Thorne-Booth | 246/182 B X |
| 3,609,676 | 9/1971 | Jauquet et al. | 246/187 B X |
| 3,727,046 | 4/1973 | Woods et al. | 246/182 C |
| 3,728,539 | 4/1973 | Thorne-Booth | 246/182 B |
| 3,731,088 | 5/1973 | Grundy et al. | 246/182 B |
| 3,740,549 | 6/1973 | Thorne-Booth | 246/122 |
| 3,786,411 | 1/1974 | Kurauchi et al. | 246/167 D X |
| 3,893,695 | 7/1975 | Rickert | 246/182 B X |
| 3,974,992 | 8/1976 | Matty | 246/182 B |
| 4,132,379 | 1/1979 | Schwarzwalder | 246/187 B X |

OTHER PUBLICATIONS

Hoyler "Design Techniques for Automatic Train Control", *Westinghouse Engineer*, vol. 32 (1972) No. 4, Jul. 1972, pp. 98-103.

*Primary Examiner*—Joseph F. Ruggiero
*Attorney, Agent, or Firm*—R. G. Brodahl

[57] ABSTRACT

There is provided a transit vehicle control apparatus and method, including a plurality of vehicle carried signal receivers operative with a transposed signal transmitting cable positioned along the vehicle track for providing an initial and higher speed position determination and then a lower speed and more accurate position determination in relation to stopping the vehicle at a desired location.

12 Claims, 8 Drawing Figures

TRANSIT VEHICLE CONTROL APPARATUS AND METHOD

BACKGROUND OF THE INVENTION

In a transit vehicle control system it is known to program the deceleration of the vehicle in relation to providing a controlled stop of the vehicle at a passenger station. A smooth and comfortable stopping of the vehicle is desired in accordance with a predetermined position accuracy such as plus or minus six inches, in relation to the vehicle location when stopped in the station. A transposed transmitting antenna cable has been positioned along the vehicle roadway track for several hundred feet before the passenger station to provide vehicle position information to the vehicle carried speed control apparatus for the purpose of making this programmed stop of the vehicle in the passenger station, as described in an article entitled "Passenger Transfer System Will Take The Long Walk Out Of Air Travel" that was published in the Westinghouse Engineer for January 1969 at pages 9 to 15.

The transposed signal transmitting cable has section lengths of twelve inches operative with vehicle carried receiver coils spaced six inches apart. To provide the desired vehicle stopping accuracy of plus or minus six inches at the passenger station platform, this requires frequent adjustment of the brake control apparatus, the system response time and the wheel tire diameters for particularly a rubber-tired vehicle such as described in the above-referenced article. A more precise measurement would permit achieving this desired distance and vehicle position accuracy in relation to the program stop antenna cable and the vehicle stopped location at the passenger station platform. In addition it would be preferred that previously provided cable installations having the twelve inch sectional lengths would not have to be changed and rebuilt and the already operational systems could continue to operate while individual vehicle carried control apparatus was up-dated. The previously installed way-side cables have known operational characteristics. If the transposed section twelve inch lengths are changed to shorter lengths, such as six inch section lengths to permit a more precise vehicle stopping accuracy, this could change the magnetic field configuration in terms of the known null occurrences in relation to the antenna and the radiated field interference problems involved.

SUMMARY OF THE INVENTION

A more precise distance measurement with a program stop receiver antenna is provided by utilizing a plurality of antenna signal sensing coils that are configured to operate with a pair of signal receivers and to be physically arranged with closer spacing to correspond in total length with the length of each transposed section of the signal transmitting cable. A first receiver is operative to provide first output signals for an initial and higher speed portion of the cable and a second receiver becomes operative to provide second output signals for the remainder and lower speed portion of the cable in relation to one of a predetermined distance from the desired vehicle stop location at the station platform or when the vehicle speed is sensed to be reduced to a predetermined value such as five miles per hour.

DESCRIPTION OF A PREFERRED EMBODIMENT

Figure 1:
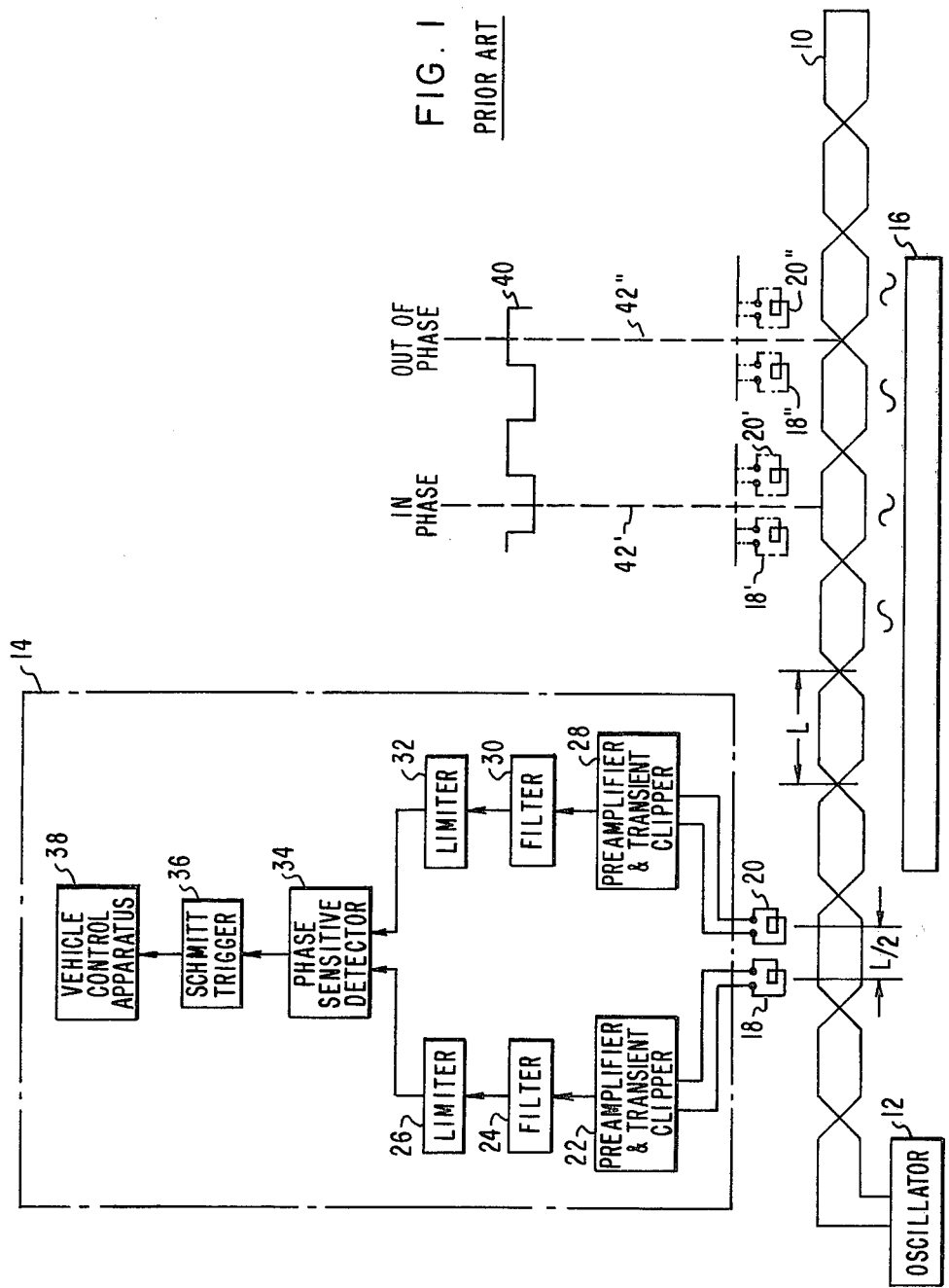
FIG. 1 shows a prior art transposed signal transmitting cable operative with receiver antenna coils for controlling the stopping program of a transit vehicle.

In FIG. 1 there is shown a prior art transit vehicle control system such as described in U.S. Pat. No. 3,740,549 of G. M. Thorne-Booth. A periodically transposed conductive cable 10 is shown coupled with an oscillator 12 providing a continuous wave signal, which cable 10 is provided in a fixed position extending along the vehicle track. The cable 10 is operative as a transmitting antenna to provide electromagnetic energy which alternately reverses with each transposed section of the cable. The phase of the electromagnetic field alternately reverses with each consecutive transposed section of the cable as symbolically shown for four of the transposition sections of the cable by phase symbols below those sections. The cable 10 is used to monitor the position of the transit vehicle 14 in relation to a station platform 16. A pair of spaced receiving antennas 18 and 20 are carried by the vehicle 14 and are positioned to pass above the transposed cable 10. The receiving antennas 18 and 20 are positioned sufficiently close above the cable such that each individual antenna, when above a transposition section of the cable, will pick up signals from that section in preference to signals from other sections of the cable 10. The distance of transposition is shown as L and the spacing between the two receiving antennas is shown as L/2, where L can be twelve inches and L/2 can be six inches. As the receiving antennas 18 and 20 move along the cable 10, the antennas will respectively receive pulse signals which are alternately in phase and out of phase with each other depending on the position over the transposed cable 10. The signals picked up by receiving antenna 18 are fed to a preamplifier and clipper 22, a crystal bandpass filter 24, and an amplifier limiter stage 26. The signals picked up by receiving antenna 20 are fed to a preamplifier and clipper 28, a crystal bandpass filter 30, and an amplifier limiter 32. The signals from the two channels are then brought together in a phase sensitive detector 34, which detects the relative in-phase and out-of-phase relationship of the signals in the two channels, with the output of the phase sensitive detector being a signal indicating either the in-phase or out-of-phase relationship of the two channels, which signal is fed to a trigger circuit 36 which squares up the signal to make it suitable as a digital input to vehicle control apparatus 38. The mode of operation is diagrammatically illustrated by the phantom line alternate positions 18', 20' and 18" and 20" of the pair of antennas and the output signal waveform 40. The pulsed signal waveform 40 represents the output of the trigger circuit 36 and corresponds to the position of the center line between the pair of receiving antennas 18' and 20' relative to the cable 10. This center line has been shown by the dashed vertical line 42' and 42" positioned midway between the receiving antennas for alternate positions of those receiving antennas respectively. The positions 18' and 20' of the antennas are such that they will pick up in-phase signals from the cable 10 and the output of the trigger circuit 36 will be at its high logic state as shown by the waveform 40. As the vehicle moves along the cable to the right the antennas will move to positions 18" and 20" where they then receive signals from the cable sections such that the received signals are out of phase and the output waveform 40 is at its low state. As the vehicle moves along the cable 10 the output signals from the trigger circuit 36 will be double the frequency at which the vehicle passes the transposition sections of the cable 10. The vehicle control apparatus 38 counts the output signals corresponding to the crossovers of the transposed sections of the cable 10 as the vehicle passes over the cable 10 in the area of a passenger station platform 16. The resulting signal count is used for the purpose of controlling the speed and deceleration of the vehicle to achieve a desired stop at a particular position alongside the platform 16.

The relationship between the transposition interval and the distance between the receiving antennas 18 and 20 has been illustrated in FIG. 1 as having a ratio of 2:1 and this produces the squarewave output 40. It is known that a pulsed output corresponding to the count of passed crossovers will be generated for a variety of distances of separation of the antennas 18 and 20, including separation distances which are less than L and distances which are greater than L. The desired pulse output will not be produced if the separation distance is L or an exact multiple of L.

Figure 2:
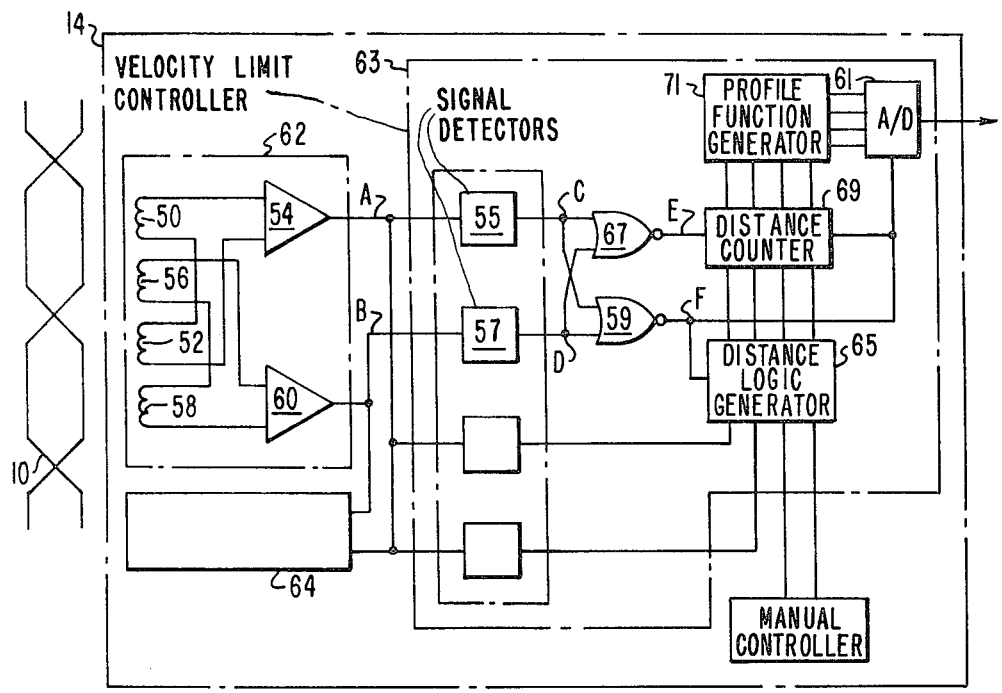
FIG. 2 shows a prior art receiver antenna coil arrangement including four signal coils.

FIG. 2 shows a prior art receiver antenna coil arrangement including four signal coils such as shown in U.S. Pat. No. 3,974,992 of T. C. Matty. The first coil 50 and the third coil 52 are coupled with a first preamplifier 54. The second coil 56 and the fourth coil 58 are coupled with a second preamplifier 60. Both a right side antenna 62 and an identical left side antenna 64 are provided so that the signal from the transposed cable 10 may be received regardless of the orientation and movement direction of the vehicle 14. The coils 50 and 52 are spaced apart by a distance equal to the distance between the predetermined crossovers of the transposed cable 10 and similarly the coils 56 and 58 are spaced apart by a distance equal to the distance between the crossovers of the transposed cable 10. In addition, the coils are electrically connected so that the voltage induced in coil 50 opposes the voltage induced in coil 52 while a crossover point is between the coils 50 and 52, and the voltage induced in coil 56 opposes the voltage induced in coil 58 while a crossover point is between the coils 56 and 58. Because of the spacing between the coils and since the coils are connected so that each coil opposes its associated coil partner when there is a crossover point between them, the preamplifiers 54 and 60 will each produce a null condition while each coil of the pair is receiving an equal induced voltage of opposite polarity from the transposed cable which occurs every time the vehicle moves a distance equal to the distance between the crossover points of the cable 10. The use of opposing pairs of coils in this manner to produce null output signal conditions is preferable to a single coil which would read null conditions at the transposed cable crossovers, because the opposing pair of coils is less susceptible to common mode noise signals. The result of this spacing is that one of the preamplifiers produces a null condition each time the vehicle moves a distance equal to one-half the distance between crossover points of the transposed cable.

The outputs of preamplifiers 54 and 60 are sent to first and second signal detectors 55 and 57 respectively as shown in FIG. 2. Signal detectors 55 and 57 are frequency sensitive devices which are tuned to the base frequency of the transposed cable 10 and which may consist of a well known device such as a Signetics 567 integrated circuit. The outputs of signal detectors 55 and 57 are at one level when receiving a signal of base frequency and are at a relatively higher level when receiving a null signal.

The outputs of signal detectors 55 and 57 are sent to a first switching gate 59 shown as a NAND device and producing an enable signal F which is at one level when signals C and D are both high, and which is otherwise at a relatively higher level. While the enable signal F is relatively low, it will prevent any output from the digital to analog converter 61 thereby preventing any output from the velocity limit controller 63. When the enable signal F becomes high, it will allow an output from both the digital to analog converter 61 and also the distance logic generator 65.

The distance logic generator 65 receives inputs from either manual or automatic sources and, when the enable signal F becomes high, provides an output which represents the pathway distance over which the velocity limit controller is to provide a signal. This pathway distance value or magnitude is predetermined in relation to each potential combination of inputs to the distance logic generator 65, so the pathway distance may vary according to the distance logic generator inputs. Such a distance logic generator may be comprised of read only memories.

The outputs of signal detectors 55 and 57 are also sent to a second switching gate 67 shown as a NOR device and producing a distance counter signal E which is at one level when either of signals C or D is high, and which is at a relatively higher level otherwise. As explained earlier, signals C and D are high only when respective signal detectors 55 and 57 receive null signals from preamplifiers 54 and 60, and preamplifiers 54 and 60 alternatively produce a null signal each time the vehicle travels one-half the distance between crossover points on the transposed cable. Therefore, distance counter signal E has a low pulse signal each time the vehicle travels one-half the distance between crossover points on the transposed cable 10.

The pathway distance value determined by the distance logic generator 65 is sent to the distance counter 69 where it is counted down according to the low pulse signals received on the distance counter signal E. Therefore, the output signal of the distance counter 69 represents, at any time after the velocity limit controller begins generating a signal, the remaining pathway distance over which a velocity limit signal is to be produced, accurate to within one-half the distance between transposed cable crossover points. This signal representing the remaining pathway distance is sent to the profile function generator 71.

The output of the profile function generator 71 represents the digital form of the desired velocity limit signal. This output may be any predetermined singular function of the remaining pathway distance signal received from the distance counter 69 including a function of at least the second and third time derivatives of the output of the distance counter 69. Such a profile function generator 71 could be comprised of read only memories. In this example of the preferred embodiment, the output of the profile function generator 71 is the digital signal necessary to cause the digital to analog converter 61 to produce the velocity limit signal. This output of the profile function generator 71 is sent to the digital to analog converter 61 where, when the enable signal F is high, the velocity limit signal is produced to control the movement of the vehicle 14 in relation to the cable 10.

Figure 3:
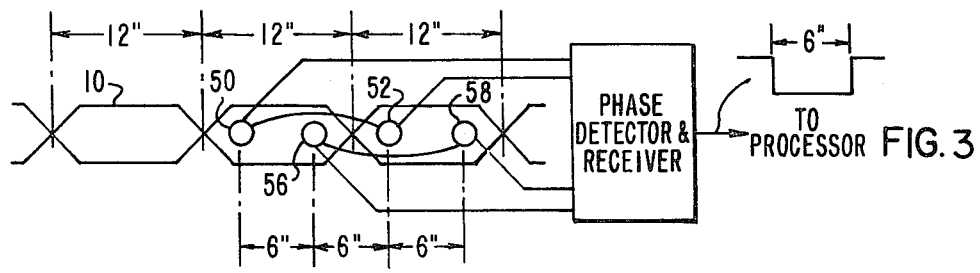
FIG. 3 schematically shows the prior art receiver antenna arrangement.

In FIG. 3 there is schematically shown the prior art recevier antenna arrangement, including four signal receiver coils, 50, 52, 56 and 58 such as shown in FIG. 2 and utilized on the transit vehicle system described in an article entitled "The Bart Train Control System" published in Railway Signaling and Communications for December 1967 at pages 18 through 23. For particularly a rubber-tired transit vehicle system described in the above-referenced published article in the Westinghouse Engineer for January 1969, the maximum rejection of common mode noise signals 68 is not required.

Figure 4:
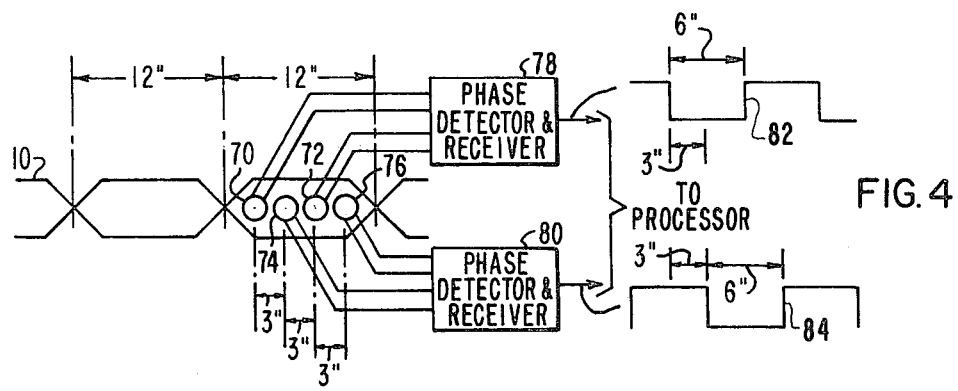
FIG. 4 schematically shows the receiver antenna arrangement of the present invention.

In FIG. 4 there is schematically shown the receiver antenna arrangement of the present invention, including signal receiver coils 70, 72, 74 and 76, with the spacing between the respective receiver coils being such that the total length of the coil arrangement is less than the transposed section length of the cable 10. The receiver coils 70 and 72 are operative with a phase detector and receiver 78, such as shown in FIG. 1, and the receiver coils 74 and 76 are operative with a second phase detector and receiver 80, such that each of the receivers 78 and 80 provides distance information every six inches from each antenna pair as shown by the signal waveform 82 corresponding to the output distance information from the phase detector receiver 78 and the waveform 84 showing the distance information provided by the phase detector and receiver 80. Because of the physical displacement of the pairs of coils 70 and 72 in relation to the pair of coils 74 and 76, the two signals 82 and 84 can be used to provide distance information every three inches of vehicle travel along the transposed cable 10.

Figure 5:
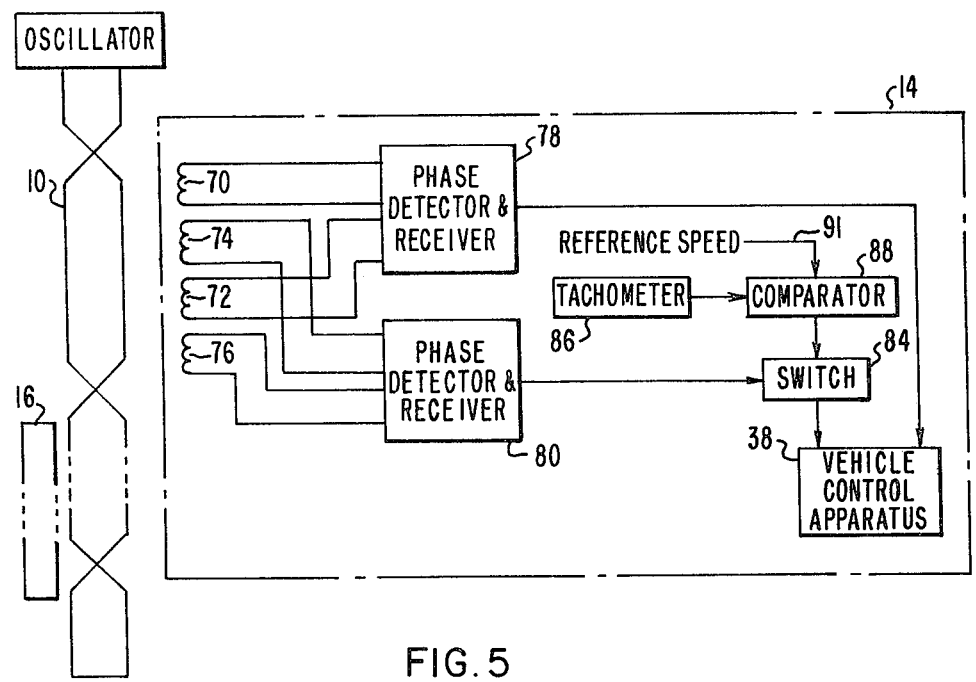
FIG. 5 shows the provision of a vehicle speed signal to determine the operation of a single receiver for the higher speed portion of the transposed cable or both signal receivers for the lower speed portion of the transposed cable.

In FIG. 5, there is shown the provision of a vehicle speed signal to select the operation of a single signal receiver or both signal receivers, respectively, in relation to the higher vehicle speed portion of the transposed cable and the lower vehicle speed portion of the transposed cable. In FIG. 5 there is shown the arrangement of the signal receiver coils 70, 72, 74 and 76 and the phase detector and receivers 78 and 80, such as shown in FIG. 4. The output signal from the phase detector and receiver 78 is applied to the vehicle control apparatus 38. The output signal from a phase detector and receiver 80 is supplied through a switch 84 to the vehicle control apparatus 38. A tachometer 86 coupled with the vehicle 14, for example with the support wheels or drive axle of the vehicle 14, is operative with the switch 84 to determine the data rate of distance information provided to the vehicle control apparatus 38. As the transit vehicle 14 is approaching a passenger station, the vehicle is traveling fast for the initial portion of the cable 10 and the crossover distance information coming from the respective receivers 78 and 80 is going to occur more frequently at the higher speed of vehicle operation. Since the physical location of a vehicle for the initial portion of the cable 10 and the greater distance from the passenger station is less important than is the physical location of the vehicle for the final portion of the cable 10 and close to or within the passenger station, the tachometer 86 provides an actual speed signal to a comparator 88 which is operative with a reference signal 90 such that for vehicle speeds above a predetermined speed such as five miles an hour the switch 84 is kept open and does not permit the output signal from the phase detector and receiver 80 to pass to the vehicle control apparatus 38. The phase detector and receiver 78 is operative to pass six-inch distance information to the vehicle control apparatus 38 at this time, the same as was done for the prior art apparatus shown in FIG. 1 and FIG. 2. However, as the vehicle is decelerated in movement along the cable 10, when the actual speed of the vehicle reaches a predetermined lower speed, such as five miles per hour, the comparator 88 closes the switch 84 such that the additional distance information from the phase detector and receiver 80 passes to the vehicle control apparatus 38 and this permits three inch distance information to be utilized for controlling the deceleration of the vehicle 14 for the remainder of the vehicle travel along the cable 10 and until the vehicle reaches a stopped position at the passenger station platform 16. At the lower speed of five miles per hour the data rate is down where it is less difficult to process as compared to the data rate for higher vehicle speeds. The second set of distance information from the phase detector and receiver 80 permits essentially double the position control resolution to be provided by the control apparatus shown in FIG. 5.

Figure 6:
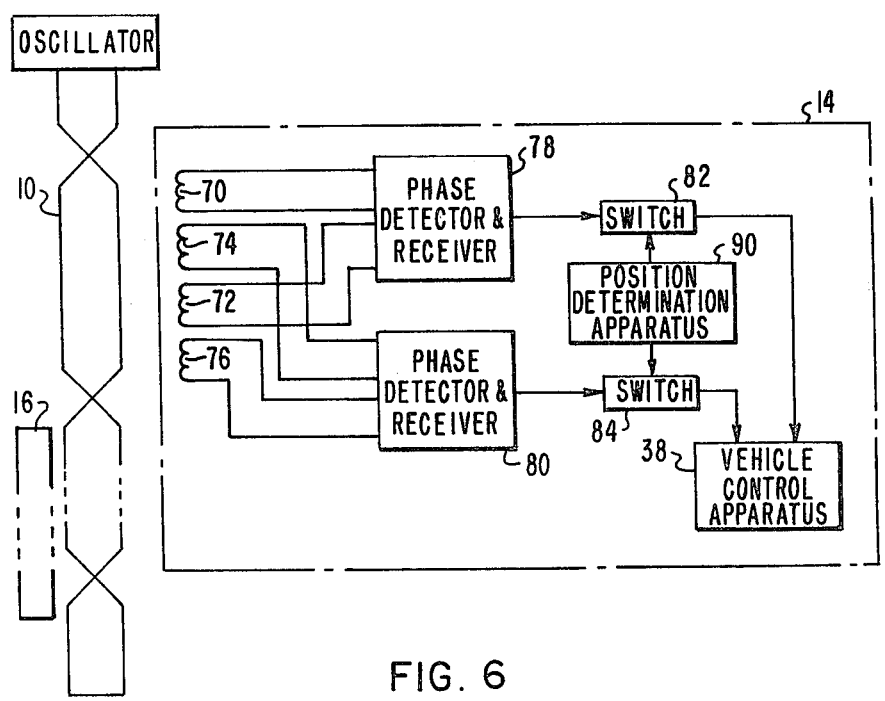
FIG. 6 shows the provision of a vehicle position signal to determine the operation of a single signal receiver or both signal receivers.

In FIG. 6 there is shown the provision of the vehicle position signal to determine the operation selection of a single signal receiver 78 or both signal receivers 78 and 80. The arrangement of the coils 70, 72, 74 and 76 and the receivers 78 and 80 shown in FIG. 6 is similar to that shown in FIG. 5. A vehicle position determination apparatus 90 is provided to control the operation of the switches 82 and 84 such that when the position of the vehicle 14 is a substantial distance away from the station platform such as more than 20 feet, the position determination apparatus 90 controls the switch 82 to pass the position information signal from the phase detector and receiver 78 to the vehicle control apparatus 38 and does not close the switch 84. When the vehicle position is less than 20 feet from the station platform 16, the position determination apparatus 90 closes a switch 84 in addition to the switch 82 and the second channel of distance information from the phase detector and receiver 80 passes through the switch 84 to the vehicle control apparatus 38. The apparatus, as shown in FIG. 5 and in FIG. 6, has the additional advantage that the independent presence of the two receiver channels including the phase detector and receiver 78 and the phase detector and receiver 80 permits continued operation of the program stop control operation included within the vehicle control apparatus 38 at a coarser accuracy of six inch intervals should either receiver channel fail to operate to thereby improve the availability of the progrm stop subsystem.

Figure 7:
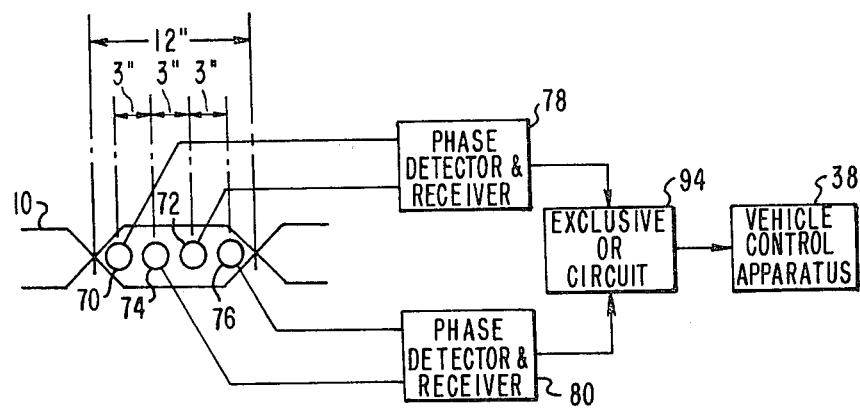
FIG. 7 shows an alternative vehicle distance measurement apparatus where a higher data rate is processed by the vehicle control apparatus.
Figure 8:
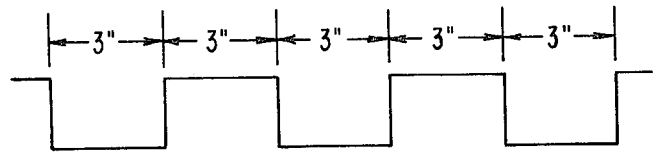
FIG 8 shows a vehicle control signal provided by the apparatus of FIG. 7.

In FIG. 7 there is shown an alternative vehicle distance measurement apparatus, where the higher data rate can be processed with no problem by the vehicle control apparatus 38 and using the same signal receiver coil arrangement including the coils 70, 72, 74 and 76 as shown in FIG. 4 with the phase detector and receivers 78 and 80. The exclusive OR circuit 94 provides the well-known function of one or the other and not both of the outputs from the respective phase detector and receiver 78 and the phase detector and receiver 80 to the vehicle control apparatus 38, to thereby provide continuous three inch distance information to the vehicle control apparatus 38. The data rate is now twice the data rate of the distance information available with the apparatus shown in FIG. 5 for the higher speed portion of the cable 10 and the apparatus shown in FIG. 6 for the vehicle distances greater than the predetermined distance at which both signal channels are supplied to the vehicle control apparatus 38. The waveform shown in FIG. 8 illustrates the distance information signal provided by the apparatus of FIG. 7.

If the wayside cable 10 of FIG. 1 is reconfigured to provide a transposed crossover at a distance L of six inches and with the vehicle carried signal receiving antennas 18 and 20 having a spacing of three inches, this would provide a three inch resolution in the distance information provided to the vehicle control apparatus 38. However, it would not provide the inherent redundancy of the apparatus shown in FIG. 5 and FIG. 6. In addition there could be a problem associated with the change in the electric field geometry due to the smaller transposition sections of the wayside antenna 10 and the higher data rates of the position information supplied to the vehicle control apparatus 38 would be more difficult to process.

What is claimed is:

1. In speed control apparatus for a passenger vehicle operative with a roadway track, including a transmitting antenna having a plurality of transposed sections and positioned along the track in relation to a location where a predetermined speed is desired, the combination of:
   a signal means having a coil arrangement including first and second pairs of coil members carried by said vehicle and coupled with the antenna to provide respective output pulse signals in accordance with the vehicle movement along each said transposed section of the antenna,
   with said coil arrangement having a total physical length less than the length of each transposed section, and
   means carried by said vehicle for controlling the speed of the vehicle in response to said output pulse signals.

2. The speed control apparatus of claim 1, including:
   first signal receiver means coupled said with first pair of coil members for providing a first of the output pulse signals,
   second signal receiver means coupled with said second pair of coil members for providing a second of the output pulse signals, and
   with said speed controlling means being responsive to at least one of said first and second output pulse signals.

3. The speed control apparatus of claim 2, with said speed controlling means being responsive to the first output pulse signal for a first predetermined operational condition of said vehicle and being responsive to both the first and the second output pulse signals for a second predetermined operational condition of said vehicle.

4. The speed control apparatus of claim 1, including:
   means responsive to the vehicle speed for providing an output signal, and
   switch means responsive to said output signal and connected between the signal means and the speed controlling means for selecting a first control of vehicle speed above a predetermined speed value in response to output pulse signals from said first pair of coil members or a second control of vehicle speed below said speed value in response to output pulse signals from said first and second pairs of coil members.

5. The speed control apparatus of claim 1, including:
   means responsive to the vehicle position in relation to said location for providing an output signal, and
   switch means responsive to said output signal and connected between the signal means and the speed controlling means for selecting a first control of the vehicle speed in response to output pulse signals from said first pair of coil members when the vehicle has a first position relationship to said location or a second control of the vehicle speed in response to output pulse signals from said first and second pairs of coil members when the vehicle has a second position relationship to said location.

6. The speed control apparatus of claim 1, including:
   signal receiving means coupled with said signal means such that said first pair of said coil members is operative to provide first output pulse signals for vehicle speeds above a predetermined speed and said first pair and second pair of said coil members are operative to provide respectively first and second output pulse signals for vehicle speeds below the predetermined speed.

7. In speed control apparatus for a vehicle traveling along a transmitting antenna having a plurality of transposed sections positioned in relation to a desired speed control location for said vehicle, the combination of:
   signal means including first and second pairs of coil members carried by said vehicle and coupled with the antenna,
   first receiver means coupled with a first pair of the coil members to provide first output signals in relation to the vehicle travel along each transposed section of said antenna,
   second receiver means coupled with a second pair of the coil members to provide second output signals in relation to the vehicle travel along each transposed section of said antenna,
   means carried by said vehicle for controlling the speed of the vehicle, and
   switch means responsive to a predetermined operational condition of the vehicle for connecting one of the first and secnd receiver means with said speed controlling means for a first operational condition of the vehicle and for connecting both of the first and second receiver means with said speed controlling means for a second operational condition of the vehicle.

8. The speed control apparatus of claim 7, with the predetermined operational condition being the speed of the vehicle traveling along the antenna.

9. The speed control apparatus of claim 1, with the predetermined operational condition being the position of the vehicle in relation to said location.

10. In the method of controlling the speed of a vehicle traveling along a roadway track having a plurality of transposed sections of cable positioned along the track in relation to a predetermined speed control location, the steps of:

sensing each of the transposed sections of the cable with first and second pairs of signal sensing means carried by said vehicle and consecutively coupled with said transposed sections of cable as the vehicle travels along the roadway track, providing first output signals from said first pair of signal sensing means and providing second output signals from said second pair of signal sensing means for each coupling with a transposed section of said cable, and controlling the speed of the vehicle in response to the first output signals until a predetermined operational condition of the vehicle occurs, and controlling the speed of the vehicle in response to both the first output signals and the second output signals after said operational condition of the vehicle occurs.

11. The speed controlling method of claim 10, with said predetermined operational condition being a selected speed of the vehicle.

12. The speed controlling method of claim 10, with said predetermined operational condition being a selected position of the vehicle in relation to said location.

* * * * *